United States Patent [19]
De Wit et al.

[11] 3,716,020
[45] Feb. 13, 1973

[54] APPARATUS FOR COATING GRANULES WITH A THIN DENSE LAYER

[75] Inventors: Willem De Wit, Heerlen; Petrus F. A. M. Hendriks, Sittard, both of Netherlands

[73] Assignee: Stamicarbon N.V.

[22] Filed: Sept. 29, 1970

[21] Appl. No.: 76,439

[52] U.S. Cl. .............. 118/303, 118/19, 118/417, 117/100
[51] Int. Cl. .............. B05b 17/00, B05c 5/00
[58] Field of Search..... 118/303, 19, 417; 117/100 A, 117/100 B, 100 C

[56] References Cited

UNITED STATES PATENTS

| | | | |
|---|---|---|---|
| 2,197,792 | 4/1940 | Erickson | 118/303 X |
| 2,563,475 | 8/1951 | Mahoney | 118/303 X |
| 2,768,095 | 10/1956 | Tadema et al. | 118/303 X |
| 3,518,967 | 7/1970 | Horrocks | 118/303 |
| 2,561,392 | 7/1951 | Marshall | 117/100 A |
| 3,101,040 | 8/1963 | Lanz | 118/303 X |
| 2,993,469 | 7/1961 | Tarpley, Jr. et al. | 118/303 |
| 3,112,220 | 11/1963 | Heiser, Jr. et al. | 118/303 X |
| 1,473,165 | 11/1923 | Steigmeyer | 118/417 X |
| 3,198,655 | 8/1965 | Gisiger | 118/303 X |
| 3,110,626 | 11/1963 | Larson et al. | 118/303 |

Primary Examiner—James Kee Chi
Attorney—Cushman, Darby & Cushman

[57] ABSTRACT

A method and apparatus for applying a thin, protective coating to individual granules by generating a liquid screen of the coating material at one end of a vertical shaft, passing the granules down through the screen and onto baffles disposed in the lower portion of the shaft. The liquid will pass down the walls of the shaft and onto the baffles and become entrained with the granules impinging thereon. A rotary drum is provided adjacent the discharge end of the shaft to intimately mix the materials passing out of the shaft.

4 Claims, 3 Drawing Figures

APPARATUS FOR COATING GRANULES WITH A THIN DENSE LAYER

The present invention relates to a process of coating granules with a thin dense, protective layer, initially applied in the liquid state. In particular, the invention relates to the coating of fertilizer granules, e.g. urea with an oily substance, which functions to reduce the lowering of the rolling tendency and the deliquescence of the granules owing to excessive moisture absorption from the air during transport and storage of the fertilizer. This moisture absorption may be largely suppressed by bagging the granules immediately after their production instead of transporting them in bulk. However, from an economic point of view it is generally more efficient to store and transport the granules in bulk, after which bagging can be done as desired. The coating substance employed here, may consist, for instance, of 75 percent mineral oil, 15 percent paraffin, and 10 percent fat and is maintained at a temperature of approximately 50°–60° C during its application, while the granules are maintained in a temperature range between 30°–50°C. After the application, the paraffin crystallizes. The oil is gradually soaked up by the granules, and the fat prevents chemical reaction of the paraffin with the granule. The coating should not be much thicker than $0.3\mu$, for reasons of economy and in order that the guaranteed nitrogen content may be maintained. The coating layer should satisfy high quality requirements and entirely encompass each granule. Even a very small opening in the coating layer may admit sufficient moisture to destroy the effect of the coating completely.

Many attempts have been made to produce a satisfactory coating, e.g. by spraying or immersion followed by centrifugation, but so far it had been impossible to obtain a coating of uniform and very small thickness which completely envelops the granules.

The present invention provides a solution which avoids the disadvantages of the prior art. More specifically, a screen of liquid is caught on one or more obliquely disposed walls or baffles, and the granules fall through the screen and onto the baffles and entrain the liquid flowing down along the baffles. The granules entrain some of the liquid of the screen in falling onto the baffles, and roll down along each baffle. The liquid screen is so controlled that all of the liquid not contacted by the granules during their fall through the screen is entrained by the granules rolling down along each baffle, so that little or no liquid drops from the bottom edge of these baffles. On account of the rolling motion, the liquid is spread uniformly over the surface of the granules.

In a preferred embodiment, the liquid screen is disposed at an angle to the vertical, and the granules are allowed to fall freely therethrough. In practice, this arrangement is both more effective as well as simpler to implement than a vertical liquid screen.

In many cases, it is desirable to intimately mix the granules collected at the bottom edge of the walls. Owing to the friction among the granules, the spreading out of the layer of coating material, the viscosity of which increases through crystallization, is completed by such mixing.

The invention also relates to an apparatus for carrying into effect the process herein disclosed which comprises a vertical shaft with a feed opening at the top and a discharge opening at the bottom, in the upper part of which shaft is mounted a sprayer of the type capable of generating a liquid screen. On different levels in the shaft, there are provided obliquely disposed baffles, which, together, are capable of intercepting all of the liquid and all of the granules passing down the shaft.

In the preferred embodiment, the sprayer consists of a cylindrical chamber placed axially in the vertical shaft, with a tangential feed opening and an axial discharge opening, to which chamber is tangentially connected a tube for the discharge of the material outside the shaft, this tube being provided with an adjustable valve. With this construction, the force with which the liquid forming the initially conical screen leaves the axial discharge opening is not influenced by the amount of liquid forming the screen. This amount is controlled by means of the valve. When the valve is fully open, the liquid will by-pass the axial discharge opening.

It is preferrable that the vertical shaft have a double wall, the space between the two walls extending to below the oblique walls and being provided with connections for the supply and discharge of a heating agent. If this agent has a temperature of, say, 100°C, the liquid is prevented from solidifying on the wall and forming encrustations there, which might clog up the shaft.

The vertical shaft may discharge at its lower end into a mixing vessel consisting of a sloping rotary drum with a supply opening in the top end face and a discharge opening in the bottom end face, with vanes provided internally therein. The quantity of the granules in this drum is more or less constant and during this stay the granules are well mixed and the coating material is properly distributed on their surface by the friction.

The drum is provided with vanes spaced from the drum wall and so disposed that, when the vanes pass through the granular content, the vanes emerge in a plane nearly coincident with the surface of the granular mass. Then ensures a proper mixing of the innermost parts of the drum contents, and prevents the granules falling freely during the mixing operation, which could cause breakage of the coating. Breakage of the coated granules when the liquid already has solidified more or less, when not followed by intimate mixing, will result in granules (or rather pieces of granules) without a completely enveloping coating being delivered, which it is an object of this invention to prevent. The ruptured faces of granules breaking in the shaft, however, will still become covered with a liquid layer, due to the friction of the granules and creep of the liquid in the lower portion of the shaft and mixing in the drum.

The invention will be elucidated with reference to the drawing, which shows one embodiment. In these drawings, FIG. 1 is a vertical section of a vertical shaft with a sprayer and mixing drum according to the invention;

Figure 1:
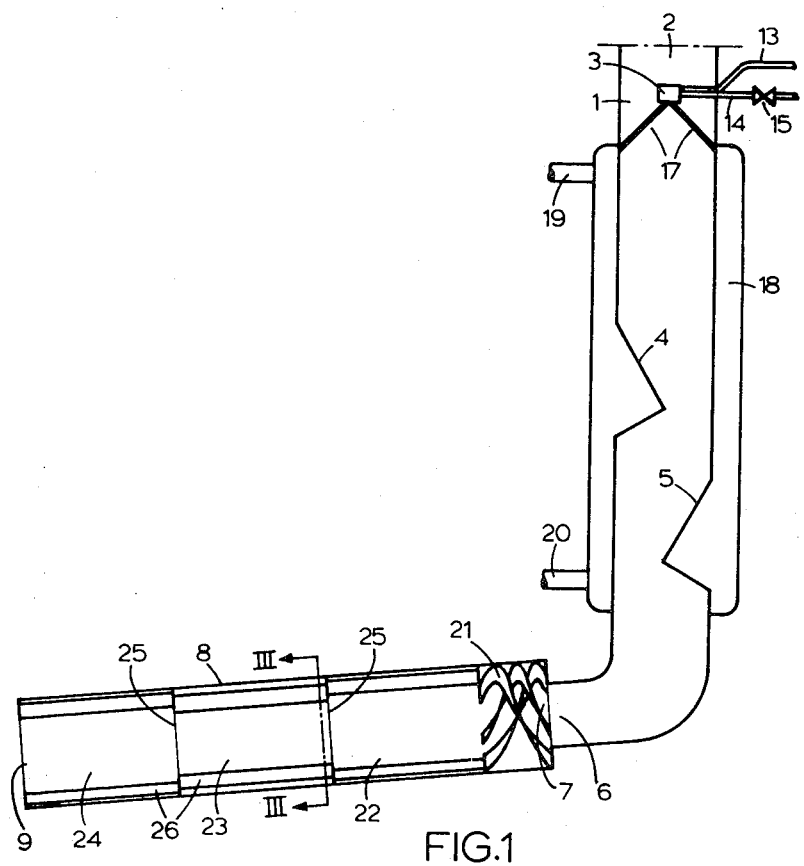

In FIG. 1, a vertical shaft 1 is represented having a feed opening 2 for freely falling granules, a sprayer, 3, oblique wall sections or baffles 4 and 5, a discharge opening 6 emptying into a feed opening 7 of a drum 8 with a discharge opening 9.

Figure 2:
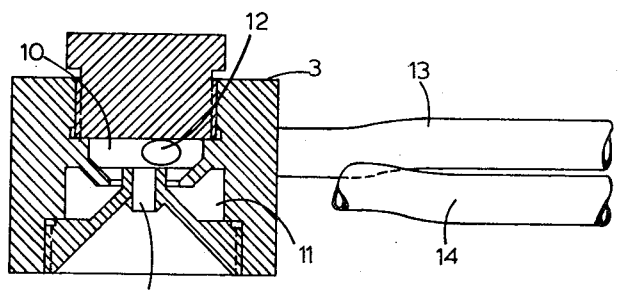
FIG. 2 is a vertical section of a sprayer on a larger scale.

As seen in FIG. 2, the sprayer 3 has a bipartite cylindrical chamber 10, 11, with a tangential feed opening 12 in the top compartment 10, connected to a feed pipe 13, and a tangential discharge opening (not shown) in the bottom compartment 11, to which is connected a discharge pipe 14. Appropriate means (not shown) of conventional design are provided to maintain the temperature of the liquid between 50°–60°C as it is fed to sprayer 3.

The discharge pipe 14 is equipped with an adjustable valve 15. The sprayer 3 is provided with a nozzle 16 for axial discharge. The liquid which, from the feed pipe 13, tangentially enters the top cylindrical chamber compartment 10 is here set in rapid rotation, so that a ring of liquid is formed. If the valve 15 is fully open, the liquid passes through the bottom compartment 11 to leave the sprayer 3 by discharge pipe 14. In that case no liquid issues through the nozzle 16. According to the degree valve 15 restricts flow, less liquid will be discharged through pipe 14, and the ring of liquid in the chamber compartment will increase so that it will soon fill up compartment 11 completely, and the liquid will commence issuing through the nozzle 16. Due to the centrifugal force generated, in the cylindrical chambers 10 and 11 a conical screen 17 of liquid will be formed. The force with which the liquid is flung away is independent of the position of valve 15, and is in part determined by the pressure of the liquid in feed pipe 13. The amount of liquid forming the liquid screen can be accurately controlled as needed by means of valve 15.

The oblique baffle sections 4 and 5 in the shaft 1 each extend inward to the center of the shaft. Together, the baffle sections 4 and 5 therefore receive all granules falling down through the liquid screen 17. Likewise, all liquid not caught by the falling granules is intercepted by the baffles 4 and 5. The valve 15 is so adjusted that the desired ratio between liquid and solid material is obtained, e.g. by means of a suitable ratio control mechanism of conventional design. All liquid flowing down along the walls of the shaft onto baffles 4 and 5 is thus entrained by the granules rolling down along the walls.

The section of the shaft 1 containing the sloping baffles sections is provided with a double wall, forming a space 18 for a heating medium, e.g. water, oil, or the like. To enable this medium to circulate, the space is provided with connections 19 and 20 for supply and discharge. The space 18 extends to below the level of the oblique wall sections 4 and 5. Ordinarily, the heating medium is maintained at a temperature of about 100°C to warm the granules and prevent the liquid from solidifying on the walls of the shaft 1.

The warm granules, now coated with a layer of liquid, leave the shaft through the discharge opening 6, which connects to the feed opening 7 in the top end face of the sloping rotary drum 8. In this drum the granules are intimately mixed, during which process the coating gets more and more viscous and is, up to the last moment, spread out by the granules rubbing against each other.

The granules are first caught by a few entrance vanes 21, which ensures a uniform feed into the first (22) of three compartments 22, 23 and 24. These compartments are identical, but are turned through an angle of 20° with respect to each other. Between the compartments there are bushing rings 25. The three compartments are rotated about their longitudinal axis by suitable power means of conventional design.

Figure 3:
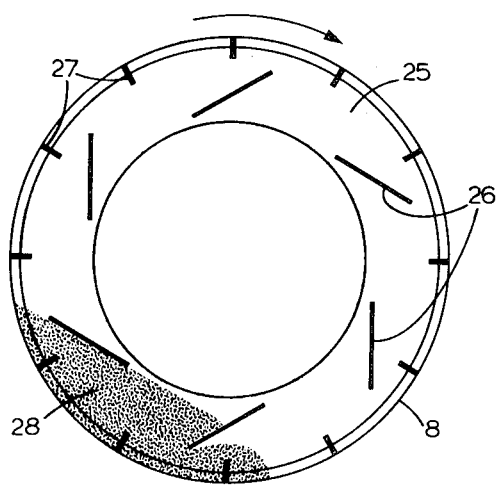
FIG. 3 is a cross section of the mixing drum along the line III—III in FIG. 1, drawn to a larger scale.

The cross section of compartment 23, shown in FIG. 3, shows six mixing vanes 26, spaced from the wall of the drum 8. In addition, there are 12 braking strips 27 on the wall. These narrow strips provide that if there is only little material in the drum, the contents 28 will be entrained over a desired length of arc. If no mixing vanes 26 were used, the contents would keep rolling down, so that the innermost particles of the contents, the core, would not be affected by the mixing or would not be mixed sufficiently. The core is stirred up by the vanes 26. The position of the vanes 26 is such that when the granular quantity 28 is large enough to ensure contact of the vanes with the granules, the granules do not drop down at all or, if they do, drop from a very small height only, when the vanes pass through the content 28 and 29.

When the granules issue from the discharge opening 9, they are ready for storage and transport.

The invention is not restricted to the embodiment here described. For instance, the mixing drum and the sprayer may be modified in many details without departing from the principles of the invention. The invention provides a simple and effective solution for the problem posed which makes a valuable contribution towards the realization of better bulk transportation.

What is claimed is:

1. Apparatus for coating material in the form of granules with a liquid to form a thin, substantially uniform protective layer on each of the granules, said apparatus comprising a generally vertically disposed shaft having an interior surface, a material feed opening at the upper end of said shaft, a material discharge opening at the lower end of said shaft, means disposed adjacent said upper end of said shaft for discharging said liquid in the form of a liquid screen into said shaft, said liquid discharging means including a first and a second cylindrical chamber each disposed axially in said shaft and having a tangential inlet and an axial outlet, each of said cylindrical chambers being disposed about a common axis, said axial outlet comprising a centrally located discharge nozzle having a portion located in said first chamber and a portion located in said second chamber, said first chamber having a circular aperture for establishing flow communication with said second chamber, said circular aperture having a surface surrounding and radially spaced from said portion of said discharge nozzle located therein, one of said two chambers being connected to a liquid feed conduit, the other being connected to a liquid discharge conduit having adjustable valve means therein, a plurality of baffled disposed obliquely with respect to said interior surface of said shaft so that, in combination, said baffles will be contacted by all liquid and all granules passing down through said shaft.

2. The apparatus as claimed in claim 1, wherein said vertical shaft is provided with a double wall extending along the axial length of said shaft from a point proximate the liquid discharging means to a point below said baffles, said double wall being provided with conduit means for the supply and discharge of a heating agent.

3. The apparatus as claimed in claim 1, wherein a mixing vessel is provided to receive the material discharged from the lower end of said vertical shaft, said mixing vessel comprising a sloping, rotary drum having a supply opening in its upper face and a discharge opening in its lower face, and having vanes disposed interiorly thereof.

4. The apparatus as claimed in claim 3, wherein said vanes are radially interiorly spaced from the walls of said drum and angularly oriented with respect to the mass of material contained in said drum so that upon passing through said material, in the course of the rotation of said drum, said vanes will emerge from said material in a plane that is substantially parallel to the plane of the surface of said material.

* * * * *